Oct. 22, 1963 P. DANTOWITZ 3,107,896
ACCELERATION CONTROL FOR FLUID TURBINES
Filed Oct. 30, 1961 2 Sheets-Sheet 1
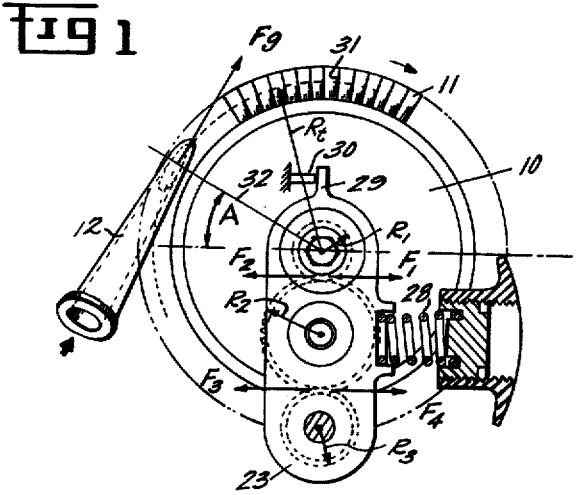
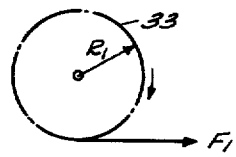
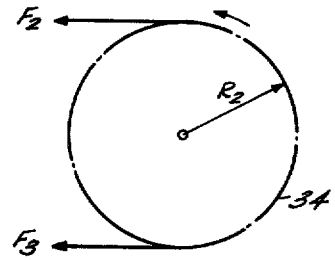
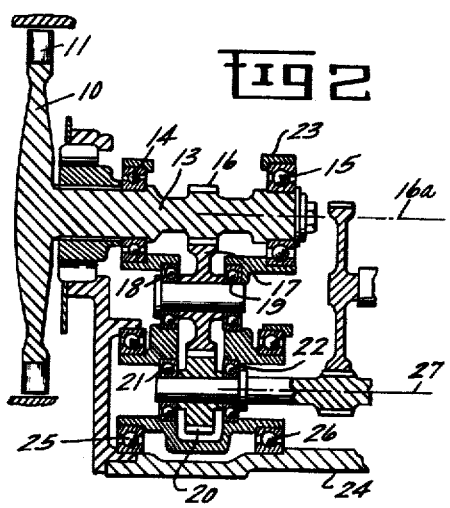
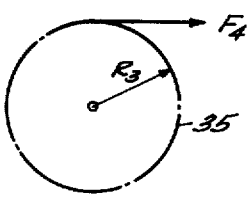
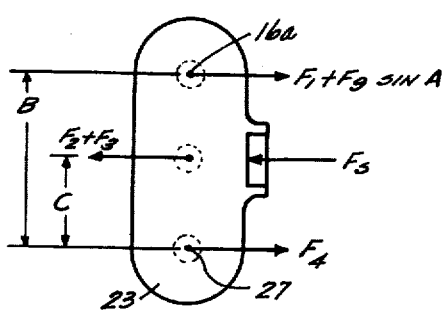
INVENTOR.
PHILIP DANTOWITZ
BY
Lawrence G. Norris
ATTORNEY

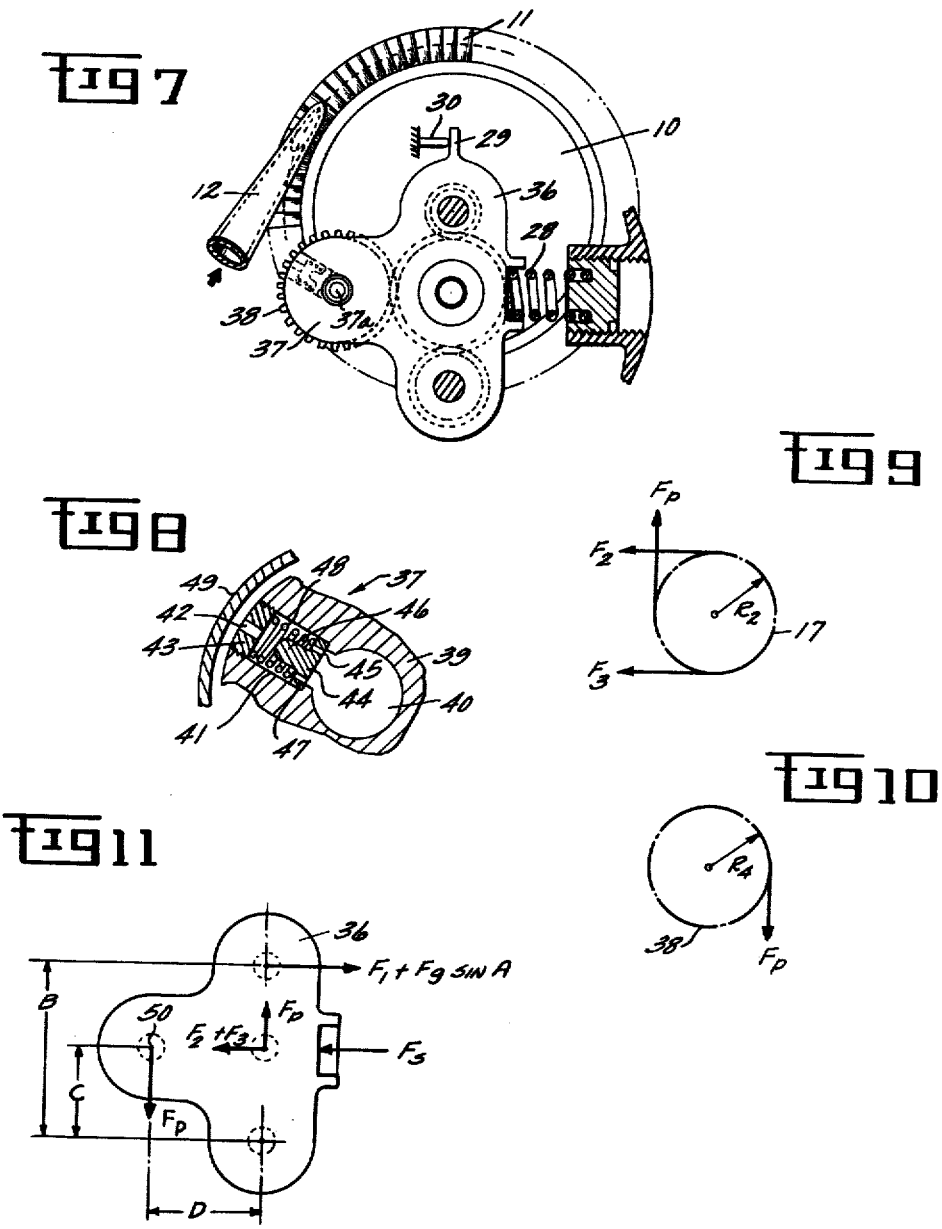

United States Patent Office 3,107,896
Patented Oct. 22, 1963

3,107,896
ACCELERATION CONTROL FOR FLUID
TURBINES
Philip Dantowitz, Peabody, Mass., assignor to General
Electric Company, a corporation of New York
Filed Oct. 30, 1961, Ser. No. 148,512
5 Claims. (Cl. 253—59)

My invention relates to an acceleration control for fluid turbines and in particular to an arrangement for controlling the acceleration of such turbines as a function of a preselected parameter which can then be held constant or established as a function of various other parameters of the system. My invention is particularly applicable to relatively small pneumatic and hot gas turbines such as gas turbine starters, gas turbine auxiliary power units and similar devices.

In certain applications of fluid turbines it becomes necessary to control the acceleration rate of the turbine as a function of certain selected parameters of the system. One such application that I am familiar with involves a gas turbine starter, which is a relatively small gas turbine unit powered from a source of gas under pressure and which is utilized to bring a large gas turbine engine such as a jet engine up to self sustaining speed. It will be appreciated that in such an application the load imposed by the gas turbine engine on the starter varies over a relatively wide range with speed and also with environmental conditions, particularly temperature and air density.

For example, in the typical case, the load imposed on the starter at the beginning of the start cycle, except for breakaway friction, will be almost pure inertia because windage and friction losses will at this point be very small. Thus, almost the entire torque output of the starter will go into accelerating the engine. As the speed increases, however, a greater proportion of the power developed by the starter will be absorbed by the increasing windage, friction and other rotating losses of the engine, leaving less torque available for acceleration if the torque output of the starter has remained relatively constant.

Now in some cases, it is desired in applications of the kind just discussed to provide particular acceleration characteristics, for example constant acceleration, over the start cycle. Where such a requirement exists, means must be provided to adjust the torque developed by the turbine to achieve the desired acceleration level.

One way of controlling the acceleration rate of such a device is, of course, to provide suitable sensing means for measuring the acceleration rate of the unit and then use the measured acceleration signal to control the flow rate of gas to the turbine to maintain the acceleration at the desired level. Such a system involves the generation of a control or command signal which specifies the desired level of acceleration either as a constant or as a function of other parameters of the system. The difference between the actual acceleration rate and that being called for is then sensed to produce an error signal calling for an increase or decrease in turbine torque depending on the direction of the correction required. Such a system also requires a means for controlling the flow of gas to the turbine wheel, a component which in itself can be quite complicated, particularly where the motor fluid to be controlled is hot gas under high pressure high velocity conditions. At any rate, it will be appreciated by those skilled in the art that such an approach involves the provision of a servo control loop with all the usual complications which accompany such systems, and with the demand for certain components such as a means for controlling hot gas flow to the turbine, and a means for sensing the acceleration rate of the turbine, which are in themselves quite complex and difficult to provide with the required accuracy. Various other approaches to the control of acceleration under such conditions are, of course, available but all of them, however, insofar as I am aware, are subject to various complications along the lines set forth above.

It is accordingly one object of my invention to provide an improved acceleration control arrangement for fluid turbines which overcomes the objections listed above and which is relatively simple in construction and reliable in operation.

It is another object of my invention to provide an improved acceleration control for fluid turbines in which the net torque generated on the turbine wheel is sensed and used directly as a control parameter.

It is another object of my invention to provide an improved acceleration control for fluid turbines in which acceleration is controlled by varying the degree of immersion of a turbine wheel in a motive fluid stream in response to certain parameters of the system.

I accomplish the above and other objects of my invention, in one embodiment thereof as applied to a small hot gas turbine unit, by rotatably mounting the turbine wheel on a pivotally mounted yoke such that the degree of immersion of the turbine buckets in the incoming hot gas stream may be varied by pivoting the yoke about its mounting point to swing the wheel into and out of the gas stream. The significant feature of my invention, as related to the application described, resides in the manner in which I control the degree of immersion of the turbine wheel in the gas stream as a function of certain parameters of the system to achieve correct control of the acceleration rate of the turbine wheel. This involves the positioning of the turbine wheel in response to a reference force applied on the yoke. Control of the acceleration rate of the wheel is then accomplished by specifying the reference force in a manner which I have described in detail later in this specification.

My invention will be better understood and the various other objects and advantages thereof will become apparent from the following description taken in connection with the accompanying drawings in which:

FIG. 1 is an end view of the turbine wheel and gearing arrangement of a gas turbine starter embodying my invention;

FIG. 2 is a side view of the arrangement of FIG. 1;

FIGS. 3, 4 and 5 are force diagrams showing the forces exerted on the various gears of the system of FIG. 1;

FIG. 6 is a force diagram showing the forces exerted on the pivotally mounted yoke on which the turbine wheel is mounted in the arrangement of FIG. 1;

FIG. 7 is an illustration of an alternative embodiment of my invention showing an arrangement in which acceleration is controlled in response to other parameters of the system;

FIG. 8 is an enlarged view of a portion of the unit shown in FIG. 7;

FIGS. 9 and 10 are force diagrams showing the forces on the gears in the system of FIG. 7; and FIG. 11 is a force diagram showing the forces on the pivotally mounted yoke of FIG. 7.

Referring now to FIGS. 1 and 2, I show a gas turbine wheel 10 having positioned around its periphery a set of buckets 11 adapted to receive hot gas from a nozzle 12. The turbine wheel is secured to a shaft 13 mounted for rotation in a pair of bearings 14 and 15. Mounted on the shaft 13 intermediate the two bearings 14 and 15 is an output pinion 16. Positioned to mesh with the pinion 16 is an idler gear 17 which is rotatably mounted on a pair of bearings 18 and 19. The idler gear 17 also meshes with gear 20 which forms part of the output gear train of the starter. In other words, the output power is transmitted from the turbine pinion 16 through the idler gear 17 to the output gear 20 and thence to the load through the remainder of the output gear train. The output gear 20 is mounted for rotation in a pair of bearings 21 and 22.

The bearings 14, 15, 18, 19, 21, and 22 are all mounted in a yoke member 23 which is, in turn, pivotally mounted in the turbine casing 24 on a pair of bearings 25 and 26. The center line of pivotal movement of the yoke 23 established by the bearings 25 and 26 is concentric with the center of rotation 27 of the output gear 20 established by the bearings 21 and 22. Thus the entire assembly of the rotatably mounted turbines wheel 10, the idler gear 17 and the output gear 20 may be pivoted around the center of rotation 27 of the output gear 20. Movement of the yoke 23 in the clockwise direction about its pivot point as viewed in FIG. 1 is opposed by a spring 28 which bears against the turbine casing 24, as shown.

With the arrangement described thus far, it will be observed that the yoke 23 may be pivoted back and forth on the bearings 25 and 26 to vary the degree of immersion of the buckets 11 on the turbine wheel 10 in the gas flowing out of the nozzle 12. The yoke 23 is provided with a tang 29 which bears against a stop 30 at the position of maximum immersion of the buckets 11 in the gas stream, a position corresponding roughly to the alignment of the bucket pitch line 31 with the directional center of the nozzle 12 such that the center of the gas stream impinges on the buckets approximately at the pitch line.

Before proceeding with an explanation of the operation of the embodiment of FIG. 1, I propose first to present an analysis of the forces imposed on the turbine wheel and on the various other elements described thus far. Considering the turbine wheel first of all, it will be appreciated that the incoming gas stream generates a force on the turbine wheel 10 which I will identify as $F_g$ and which for all practical purposes may be assumed to be in a direction tangent to the bucket pitch line 31 at the point of intersection of the radial line 32 through the center of the gas stream with the bucket pitch line. In other words, the force generated by the incoming gas on the buckets, although in fact distributed over a sector of buckets, may for purposes of analysis be assumed to be a single force $F_g$ acting at the center of impingement in a direction tangent to the bucket pitch line 31. The angle between the horizontal and the radial line 32 through the center of impingement of the gas stream, which will be referred to later on in the specification, is identified as the angle A. The radius from the center of rotation of the turbine wheel to the bucket pitch line is identified by the symbol $R_t$.

Referring now to FIG. 3, I show a force diagram for the turbine pinion 16. Assuming a clockwise direction of rotation of the turbine wheel as viewed in FIG. 1, a reaction force $F_1$ will be imposed on the pinion at the point of mesh with the idler gear 17. In the arrangement shown, the centers of rotation of the gears 16, 17 and 20, and hence the points of mesh, all lie along a vertical line passing through the centers of rotation. The force $F_1$ is thus in the horizontal direction and tangent to the pitch line 33 of the pinion 16, which is at a radius $R_1$ from the center of rotation of the pinion.

In the case of the idler gear 17, the force diagram for which is shown in FIG. 4, meshes with both the pinion 16 and the output gear 20 result in the imposition of two forces $F_2$ and $F_3$, both of which are horizontally directed at the pitch line 34 at a radius $R_2$ from the center of rotation. A single force $F_4$ is imposed on the output gear 20 at the point of mesh with the idler gear 17, as illustrated in FIG. 5. The force $F_4$ is horizontally directed tangent to the pitch line 35 at a radius $R_3$ from the center of rotation of the gear.

The resultant forces imposed on the yoke 23 will now be examined.

The forces on the gears 16, 17 and 20 can be transmitted to the yoke 23 only through the bearings in which these gears are mounted, and assuming frictionless bearings, will thus be imposed through the centers of rotation of the bearings. For example, the force $F_1$ on the pinion 16 can be imposed on the yoke 23 only through the reaction of the bearings 14 and 15 on the yoke. Because the bearings are assumed frictionless, forces in directions other than the direction of $F_1$ cannot be generated, and a force in the direction of $F_1$ can be imposed only in a direction passing through the center of rotation 16a of the bearings 14 and 15.

Another force which is imposed on the yoke 23 is the force $F_g$ on the turbine wheel generated by the gas impinging on the wheel. The force vector $F_g$ can be separated into a horizontal component and a vertical component, the vertical component being $F_g \cos A$ and the horizontal component being $F_g \sin A$. The force $F_g$ will also be imposed on the yoke through the bearings 14 and 15 in the same manner as the force $F_1$. The vertical component, however, of $F_g$ will pass directly through the pivotal center 27 of the yoke and hence will impose no moment on the yoke. The horizontal component $F_g \sin A$ will be in the same direction as and add to $F_1$ as shown in FIG. 6.

Similarly, the horizontally directed forces $F_2$ and $F_3$ imposed on the idler 17 will be directed against the yoke 23 through bearings 18 and 19 through the center of rotation of these bearings. The force $F_4$ will be directed as shown in FIG. 6 through the center of rotation 27 of the yoke and will thus produce no moment on the yoke about its center of rotation. The center line of the spring 28 passes through the center of rotation of the idler 17 and the spring force $F_s$ is thus directed against the yoke along the same line as the forces $F_2$ and $F_3$.

For purposes of analysis, the center of rotation of the bearings 14 and 15 will be assumed to be located at a moment arm distance B from the pivotal center 27 of the yoke. The center of rotation of the bearings 18 and 19 will be assumed to be at a moment arm distance C from the pivot 27. An analysis of the operation of the arrangement shown in FIG. 1 will now be presented.

Considering first of all the torque producing forces on the turbine wheel 10 and the pinion 16, the gas force $F_g$ exerts a torque on the wheel equal to the magnitude of $F_g$ multiplied by the radius $R_t$, and the reaction torque in the opposite direction is equal to the pinion reaction force $F_1$ multiplied by the radius $R_1$. The difference between these two torques is the net torque on the turbine wheel which is available for accelerating the wheel and for supplying wheel losses such as windage and friction. From the foregoing relationship, the following equation can be formed:

(1) $$I\alpha = F_g R_t - F_1 R_1 - T_L$$

Where I is the polar moment of inertia of the turbine wheel, $\alpha$ is the angular acceleration, and $T_L$ is the torque on the turbine wheel produced by the wheel losses. It will be observed from the equation that the turbine wheel acceleration $\alpha$ is a function of the reaction force $F_1$ which in turn varies with the load on the unit. Now what I propose to do is to cause the gas force $F_g$ to vary also, in some preselected relationship to the variation in $F_1$, to cancel out the effect of $F_1$ and permit control of the magnitude of the turbine wheel acceleration $\alpha$.

Referring now to the force diagrams of FIGS. 3, 4 and 5 and keeping in mind the fact that the force exerted by each of the gears on the gear with which it meshes is equal to the reaction force exerted by that gear, the following relationship may be set out:

(2) $$F_1 = F_2$$

In addition, because the inertia of the idler gear 17 is negligible, it will require almost zero unbalanced torque for acceleration. The following static equation is therefore valid:

(3) $$F_2 = F_3$$

And, combining Equations 2 and 3:

(4) $$F_1 = F_2 = F_3$$

Now, summing the moments on the yoke 23 about its pivotal center and specifying the conditions for static equilibrium, the following equation is formed:

(5) $$BF_1 + BF_g \sin A - CF_2 - CF_3 - CF_s = 0$$

Substituting the relationship of Equation 4, Equation 5 becomes:

(6) $$BF_g \sin A - CF_s - (2C-B)F_1 = 0$$

This can be solved for $F_g$ to yield:

(7) $$F_g = \frac{C}{B \sin A} F_s + \frac{(2C-B)}{B \sin A} F_1$$

Substituting the relationship for $F_g$ of Equation 7 into Equation 1, the following expression is obtained:

(8) $$\alpha = \frac{R_t C}{IB \sin A} F_s - \frac{T_L}{I} + \left[ \frac{(2C-B)R_t}{IB \sin A} - \frac{R_1}{I} \right] F_1$$

If $\alpha$ is to be made insensitive to the effects of the load reaction force $F_1$, then the coefficient of $F_1$ in Equation 8 must be made to vanish. This yields the requirement:

(9) $$R_1 = \frac{(2C-B)R_t}{B \sin A}$$

Since $R_1$ must be a positive number, the term $(2C-B)$ must also be positive. In other words, the moment arm C must be greater than half the moment arm B. Assuming that the requirements of Equation 9 are satisfied, Equation 8 then becomes:

(10) $$\alpha = \frac{R_t C}{IB \sin A} F_s - \frac{T_L}{I}$$

It will be observed that by following the approach described above in which the effect on turbine acceleration of the load reaction force $F_1$ is eliminated by the provision of a component in the variable gas force $F_g$ which cancels out this term, the turbine acceleration $\alpha$ is isolated and related to an externally controllable parameter $F_s$, the force generated by the spring 28.

As will be explained later, the reference force $F_s$ may be generated in a number of ways and in response to various other system parameters to achieve control of turbine acceleration to any desired characteristic. As I pointed out above, the moment $BF_1$ on the yoke must be less than the moment $2CF_1$ generated by the forces $F_2$ and $F_3$, such that the net moment on the yoke produced by the load reaction forces is in a direction opposing the moment generated by the gas force $F_g$.

It will be observed that the moment on the yoke produced by the gas force $F_g$ is in a direction tending to move the wheel 10 out of the gas stream whereas the net moment on the yoke produced by the load reaction forces is in a direction tending to move the wheel into the gas stream. Under equilibrium conditions, the difference between these two moments is equal to the moment produced on the yoke by the spring force $F_s$ or, in other words, directly proportional to the force $F_s$. It will be observed that the net torque on the wheel 10 is also directly proportional to the spring force $F_s$. This is best shown by rewriting Equation 10 as follows:

(10a) $$\text{Net Torque} = I\alpha + T_L = \frac{R_t C}{B \sin A} F_s$$

Thus, the net torque on the turbine wheel 10 is directly proportional to the difference in the moments produced on the yoke 23 by the gas force $F_g$ and the load reaction forces.

In other words, the net effect of the gas force $F_g$ and the load reaction forces is to move the turbine wheel 10 out of the gas stream, the net effect being proportional to the actual torque on the wheel. Under equilibrium conditions, the net effect of the reference force $F_s$ is to move the wheel into the gas stream until equilibrium is achieved. If it is desired to vary the net torque on the wheel, the spring force $F_s$ can be varied, the new force $F_s$ being proportional to a new desired net torque. The yoke 23 will then move the wheel 10 until the actual net torque is equal to the desired net torque as specified by the reference force $F_s$.

Consider now an example wherein the unit is to be used as a starter and it is desired to maintain substantially constant acceleration over a substantial portion of the start cycle and then to reduce the acceleration rate as higher wheel speeds are approached, ultimately reducing the acceleration to zero at some limiting speed to provide overspeed protection for the unit. In this type of application, I select a spring 28 which has a very low gradient such that the force $F_s$ which is generates remains essentially constant with deflection over the range of operation selected.

At the beginning of the cycle, and at the time the supply of gas starts to flow from the nozzle 12, the wheel will be in the position shown in FIG. 1 with the tang 29 against the stop 30 and the buckets 11 fully immersed in the gas stream because the wheel will be held in this position by the force developed by the spring 28. As the gas impinges on the turbine buckets, however, the force $F_g$ will be developed on the wheel which imposes a moment on the wheel yoke 23 in a direction tending to move the wheel out of the gas stream. At the same time, as an output torque is developed by the wheel, a load reaction force will be generated which, as explained above, will exert a net moment on the yoke 23 in a direction tending to move the wheel into the gas stream, or in other words, in a direction opposing the moment generated by the gas force $F_g$.

In order to have a positive value of acceleration of the turbine wheel, the torque generated on it by the gas must be greater than the reaction torque generated by the load. The moments on the yoke 23 are arranged such, as will be apparent from an analysis of the preceding discussion, that under the foregoing conditions established for positive acceleration, the net moment on the yoke produced by the gas force $F_g$ and the load reaction forces is in a direction tending to move the wheel out of the gas stream. In this sense, the system may be said to be degenerative in that a positive acceleration condition produces a net force in a direction tending to reduce acceleration.

Assuming that the moment produced on the yoke 23 by the gas force on the wheel and by the load reaction forces is greater than the moment produced in the opposite direction by the spring force $F_s$, the wheel will then begin to move out of the gas stream. As the wheel moves in a direction decreasing the degree of immersion of the buckets 11 in the gas stream, the force $F_g$ generated on the wheel by the incoming gas begins to decrease. As the magnitude of the force $F_g$ decreases, the net moment on the yoke produced by the difference between the gas force and the load reaction force will also decrease, and this process will continue until the net moment on the yoke produced by the difference between the moments produced on the yoke by the gas force and the load reaction forces is equal to the moment produced in the opposite direction by the spring force $F_s$. At this point the yoke 23 reaches an equilibrium position where it will remain, so long as the force balance continues.

Now, before going further, it will be observed at this point that the net torque on the turbine, that is the difference between the torque produced by the gas force and the torque produced by the load reaction, has its magnitude established by the magnitude of the force $F_s$. This is best shown by Equation 10a. In other words, if the net torque on the wheel is greater than that called for by constant force $F_s$, the wheel will move further out of the gas stream and will continue to do so until the net torque on the wheel is reduced to the level required by the spring force $F_s$. Similarly, if the net torque on the wheel is lower than required by $F_s$, then the force $F_s$ will cause the wheel to move further into the gas stream until the net torque on the wheel is increased to the level specified by the magnitude of $F_s$.

Note here that when I use the phrase "net torque on the wheel," I mean the torque difference between the torque exerted on the wheel by the incoming gas and the torque exerted by the load, or in other words the torque left over for accelerating the wheel and supplying wheel losses. It is the magnitude of this force which is specified by the magnitude of the reference force $F_s$. Where $F_s$ is held constant as in the present example, the net torque will remain constant in accordance with Equation 10a.

At the beginning of the start cycle and up until such time as the turbine wheel speed becomes appreciable, the wheel losses, composed primarily of windage and friction, will be negligible and thus the net torque on the wheel will go almost entirely into accelerating the wheel. Since this net torque on the wheel is held constant at the level specified by the reference force $F_s$, the acceleration over this portion of the cycle will also be held substantially constant. The mathematics depicting this condition are shown in Equation 10. It will be observed that where the torque $T_L$ produced by the turbine wheel losses is negligible, the acceleration $\alpha$ is proportional only to the geometric parameters of the system and to the magnitude of $F_s$.

As the wheel speed continues to increase, however, and the wheel losses becomes appreciable, more of the net torque on the turbine wheel is used to supply the losses and less goes into accelerating the wheel. Thus, if the reference force $F_s$ remains constant such that the net torque on the wheel is also held constant, the wheel speed will eventually reach a point where the entire net torque on the wheel will be absorbed by wheel losses, leaving nothing left over for wheel acceleration. At this point, the turbine wheel acceleration becomes zero and the speed levels off at that point. Mathematically, this corresponds to the condition in Equation 10 where the term $$\frac{T_L}{I}$$

becomes equal to the term $$\frac{R_t C F_s}{IB \sin A}$$

a condition where the wheel acceleration $\alpha$ becomes zero.

It will be observed that the foregoing condition occurs only where the net torque available continues to remain sufficiently large to produce a positive acceleration. In other words, if the load characteristics were such that the load absorbed all the power generated by the turbine at a speed lower than that specified by Equation 10, then the condition described above would never be reached. The important point, however, is that the maximum speed limit established by the above described characteristic of the system is independent of the load and will thus prevent overspeeding of the system under any condition; for example, where the load is removed entirely by the failure of a shaft, or the like.

Although for the example described above, I have chosen the reference force $F_s$ to be held as a constant, it should be apparent that this parameter may also be related to other parameters of the system. In addition, other reference forces having selected characteristics may also be imposed on the yoke to achieve any number of desired relationships.

For example, in the embodiment of my invention illustrated in FIGS. 7–10, I show an arrangement in which a speed dependent force is also imposed on the yoke such that the net torque on the wheel is varied as a function of speed.

In this arrangement, I provide a yoke 36 which is similar to the yoke 23 with the exception that it supports a small pump 37 mounted in the yoke in bearings 37a and driven by a gear 38 from the idler gear 17. The pump 37 may be of any suitable type, its sole function in this case being to impose a speed dependent force on the yoke 36.

For purposes of illustration, I have chosen a simple centrifugal pump, the essentials of which are shown in FIG. 8. The construction comprises a block 39 having a centrally positioned inlet 40 and a radially extending cylinder 41 terminating in a discharge orifice 42 formed in a plug 43.

Positioned in the cylinder 41 is a piston 44 which has formed in it a series of fluid passages 45. Extending from the piston 44 is a plug 46 which is shaped to mate with and close off the passage 42 under conditions to be described later. The piston is normally held in place at the bottom of the cylinder against a stop 47 by a spring 48.

When the pump is rotated, fluid is pumped from the inlet 40 through the passages 45 and out the orifice 42 into the interior of the pump casing 49 where it is allowed to drain back to the sump. In other words, fluid is merely recirculated through the pump.

It will be apparent that the energy absorbed by the pump 37 in recirculating the fluid increases with increasing speed and that the reaction force exerted on the idler gear 17 by the pump gear 38 thus increases with increasing speed. In FIG. 9, I show a force diagram of the idler 17 with the reaction force $F_p$ of the pump imposed on it. The center of rotation 50 of the pump is horizontally aligned with the center of rotation of the idler 17 so that the force $F_p$ is in the vertical direction. A force of the same magnitude $F_p$ is exerted vertically downward on the gear 38 at the pitch radius $R_4$ as shown in FIG. 10. The forces exerted on the pinion 16 are the same as illustrated in FIGS. 3 and 5.

Because the inertia of the gear 17 is negligible, the unbalance force on it will also be negligible and the following static equation can therefore be formed:

(11) $\qquad F_2 = F_3 + F_p$

Referring now to the force diagram for the yoke 36 as illustrated in FIG. 11, it will be observed that the force $F_p$ on the gear 38 is exerted vertically downward on the yoke along a line passing through the center of rotation of the gear 38. The equal and oppositely directed force $F_p$ which is exerted on the idler 17 is directed upward along a line passing through the center of rotation of the idler and through the pivot center 27 of the yoke and therefore produces no moment on the yoke.

Summing the moments on the yoke 36 and taking into account the additional force $F_p$ of the pump, the equilibrium equation for the yoke becomes:

(12) $\quad BF_1 + BF_8 \sin A - CF_2 - CF_3 - CF_s - DF_p = 0$

Using the relationships previously derived together with that set forth in Equation 11, Equation 12 may be solved for $F_g$ as follows:

(13) $\quad F_g = \frac{(2C-B)}{B \sin A} F_1 + \frac{(D-C)}{B \sin A} F_p + \frac{C}{B \sin A} F_s$ Substituting this relationship back into Equation 1 yields the following expression for wheel acceleration:

(14)
$$\alpha = \frac{(D-C)}{IB \sin A}F_p + \frac{CR_t}{IB \sin A}F_s + \left[\frac{(2C-B)R+}{IB \sin A} - \frac{R_1}{I}\right]F_1\frac{T_L}{I}$$

Setting the coefficient of $F_1$ equal to zero yields the same expression for $R_1$ as set forth in Equation 9. By setting $R_1$ equal to the value thus specified, the following final expression for acceleration is obtained:

(15)
$$\alpha = \frac{(D-C)R_t}{IB \sin A}F_p + \frac{CR_t}{IB \sin A}F_s - \frac{T_L}{I}$$

It will be observed here, as is the case with the embodiment of FIGS. 1 and 2, that the acceleration is independent of the load imposed on the unit. It will also be observed that the acceleration is a function of the pump reaction force $F_p$ in addition to its being a function of the spring force $F_s$ and the turbine wheel torque $T_L$ attributable to wheel losses.

It will be recalled from the earlier discussions that the characteristic of the pump 37 is such that the pump driving force $F_p$ increases with speed. In addition the wheel torque $T_L$ attributable to wheel losses increases as a function of speed. Now, if the pump characteristic is chosen such that $F_p$ approximately matches the speed dependent relationship of $T_L$, then, as will be observed from Equation 15, the acceleration will remain substantially constant over the full speed range. It will be noted that the turbine wheel should not exceed a maximum speed at which the wheel stresses caused by centrifugal force are at the maximum permissible value. If the pump force $F_p$ is allowed to continue to increase, however, the wheel will continue to accelerate and be destroyed. Therefore, the spring 48 is chosen so that the piston 44 will move outwardly under the influence of centrifugal force at a specified speed so that the plug 46 will close off the passage 42, thereby stopping the pumping action. Since the force $F_p$ will no longer be created, the wheel will stop accelerating since, at that speed, the net torque is absorbed fully by wheel losses $T_L$.

What has been done here is to provide a reference force, the magnitude of which is speed dependent such that the resulting characteristic approximately matches the speed dependent characteristic of the torque arising from wheel losses. It will be apparent of course that any desired characteristic may be selected for the reference force to provide control of the net torque on the wheel in accordance with any desired relationship.

It will also be apparent that my invention may take forms other than the particular ones described. For example, the wheel may be movably mounted in another fashion, the only requirement being that it be supported in movable mounting means permitting the degree of immersion in the motive fluid stream to be varied. In addition, the reference force may be imposed in any suitable fashion.

Thus, it will be apparent from the foregoing that various changes, modifications and substitutions may be made in the embodiments of my invention presented herein without departing from its true scope and spirit as defined in the appended claims.

What I claim as new and desire to secure by Letters Patent of the United States is:

1. Means for controlling the net torque imposed on a turbine wheel by a stream of motive fluid and by a load connected to said wheel comprising:
   (a) movable mounting means rotatably supporting said wheel,
   (b) said mounting means adapted to move in response to forces imposed thereon to vary the magnitude of the force imposed on the wheel by the fluid stream,
   (c) means connecting said wheel to the load,
   (d) means transmitting the forces imposed on said turbine wheel and said connecting means by the motive fluid stream and the load to said mounting means such that the net effect of the forces on said mounting means is proportional to the actual net torque on the wheel and in a direction to move said wheel to decrease the magnitude of the force imposed on the wheel by the fluid stream,
   (e) and means imposing a reference force proportional to a desired net torque on the wheel on said movable mounting means in a direction to move said wheel to increase the magnitude of the force imposed on the wheel by the fluid stream,
   (f) whereby the mounting means is moved to an equilibrium position in which the actual net torque on the wheel is equal to the desired net torque specified by the reference force.

2. Apparatus as set forth in claim 1 in which the means for imposing said reference force includes means responsive to the speed of said turbine wheel for varying the magnitude of said reference force as a function of turbine wheel speed.

3. Means for controlling the net torque imposed on an axial flow turbine wheel by a stream of motive fluid impinging against buckets peripherally mounted on said wheel and by a load connected to said wheel comprising:
   (a) a movably mounted yoke rotatably supporting said wheel,
   (b) said yoke adapted to move in response to forces imposed thereon to move the wheel periphery into and out of the motive fluid stream and thereby vary the magnitude of the net torque imposed on the wheel,
   (c) gearing means mounted in said yoke,
   (d) means connecting said wheel to the load through said gearing means,
   (e) means transmitting the forces imposed on said turbine wheel and said connecting means by the motive fluid stream and the load to said yoke such that the net effect of the forces on said yoke is proportional to the actual net torque on the wheel and in a direction to move the wheel periphery out of the motive fluid stream,
   (f) and means imposing a reference force proportional to a desired net torque on said yoke in a direction to move the wheel periphery into the motive fluid stream,
   (g) whereby said yoke is moved to an equilibrium position in which the actual net torque on the wheel is equal to the desired net torque specified by the reference force.

4. Means for controlling the net torque imposed on an axial flow turbine wheel by a stream of motive fluid impinging against buckets peripherally mounted on said wheel and a load connected to said wheel comprising:
   (a) a pivotally mounted yoke rotatably supporting said wheel,
   (b) said yoke adapted to move angularly in a plane parallel to the plane of rotation of said wheel to move the wheel periphery into and out of the motive fluid stream and thereby vary the magnitude of the net torque imposed on the wheel,
   (c) output gearing means mounted in said yoke,
   (d) means connecting said wheel to the load through said output gearing means,
   (e) means transmitting the forces imposed on said turbine wheel and said connecting means by the motive fluid stream and the load to said yoke such that a net moment proportional to the actual net torque on the wheel is imposed on the yoke in a direction to move the wheel periphery out of the motive fluid stream,
   (f) and means imposing a reference force proportional to a desired net torque on said yoke to produce a moment in a direction to move the wheel periphery into the motive fluid stream, (g) whereby said yoke is pivoted to an equilibrium position specified by the magnitude of the reference force at which the net torque on the wheel is equal to the desired net torque.

5. Apparatus as set forth in claim 4 in which the means for imposing the reference force on said yoke comprise pumping means rotatably mounted in said yoke and driven by said turbine to produce a moment on said yoke, said pumping means having a speed dependent characteristic in which the reference force imposed on said yoke increases with increasing speed.

References Cited in the file of this patent

UNITED STATES PATENTS

| | | |
|---|---|---|
| 2,609,661 | Nardone | Sept. 9, 1952 |
| 2,614,798 | Rubbra | Oct. 21, 1952 |
| 2,685,428 | Tressl | Aug. 3, 1954 |
| 2,689,707 | Graham | Sept. 21, 1954 |

FOREIGN PATENTS

| | | |
|---|---|---|
| 1,074,095 | France | Oct. 1, 1954 |

UNITED STATES PATENT OFFICE
CERTIFICATE OF CORRECTION

Patent No. 3,107,896                          October 22, 1963

Philip Dantowitz

It is hereby certified that error appears in the above numbered patent requiring correction and that the said Letters Patent should read as corrected below.

Column 6, line 33, for "is" read -- it --; column 7, line 46, for "becomes" read -- become --.

Signed and sealed this 28th day of April 1964.

(SEAL)
Attest:

ERNEST W. SWIDER
Attesting Officer

EDWARD J. BRENNER
Commissioner of Patents